United States Patent

[11] 3,630,738

| [72] | Inventors | Kenneth M. Dear<br>Luton, Bedfordshire;<br>Roy A. Jeffreys; David A. Thomas, both of<br>Hatch End, Middlesex, all of England |
|---|---|---|
| [21] | Appl. No. | 827,154 |
| [22] | Filed | May 23, 1969 |
| [45] | Patented | Dec. 28, 1971 |
| [73] | Assignee | Eastman Kodak Company<br>Rochester, N.Y. |

[54] BRIGHTENING AGENTS
8 Claims, No Drawings

[52] U.S. Cl. .................................................. 96/82,
96/84, 96/56.3
[51] Int. Cl. ........................................ G03c 1/92,
G03c 1/84
[50] Field of Search .......................... 96/82, 56.3,
84

[56] References Cited
UNITED STATES PATENTS

| 3,250,617 | 5/1966 | Sawdey .......................... | 96/56.3 |
|---|---|---|---|
| 2,496,843 | 2/1950 | Anish ............................ | 96/84 |

Primary Examiner—Norman G. Torchin
Assistant Examiner—Edward L. Kimlin
Attorneys—W. H. J. Kline, James R. Frederick and Ray Carter Livermore ABSTRACT: Thiazolo(5,4-d)thiazoles substituted with polycyclic aromatic groups or heterocyclic groups either directly onto the 2- and 5-positions or onto the 2- and 5-positions through conjugated linking groups, are valuable brightening agents for use in photographic elements or in polymeric materials.

BRIGHTENING AGENTS

This invention is related to brightening agents, photographic elements containing brightening agents and polymers containing brightening agents.

Light areas of photographic color print and other products such as fibrous and plastic articles are often made to look brighter by incorporating brightening agents. These brightening agents fluoresce on irradiation with ultraviolet (U.V.) light, emitting visible light, usually bluish in hue, thus enhancing the whiteness of the object. Such products also frequently contain ultraviolet sensitive ingredients such as dyes, organic polymers, etc. which require protection from irradiation in the ultraviolet region especially from 360 to 400 $\mu$. Optical brighteners are inherently ultraviolet absorbers and depend on this characteristic for the energy required to fluoresce in the visible region of the spectrum. However, most of the known optical brightening agents either are decomposed by prolonged exposure to irradiation or do not satisfactorily absorb the longer wavelength ultraviolet radiation ultraviolet about 360 and 400 $\mu$ which is primarily responsible for the harmful effects produced in such products as color photographs, dyed plastic films, filaments, etc. If conventional ultraviolet absorbers are added, they will absorb part of the radiation needed to excite the optical brighteners and thus reduce their efficiency. Accordingly, there is a need for addenda which provide good efficiency both in optical brightening and absorbing the harmful ultraviolet radiation.

Sawdey, U.S. Pat. No. 3,250,617, describes the use of 2,5-diphenylthiazolo(5,4-d)thiazoles and their use in photographic elements as ultraviolet light absorbers. While these compounds are good ultraviolet absorbers, they do not fluoresce. New ultraviolet light absorbing brightening agents are desired for photographic use as well as for protecting and brightening polymeric materials.

It is therefore an object of our invention to provide our novel thiazolo(5,4-d)thiazoles which are not only good ultraviolet absorbers but good brightening agents.

It is another object of our invention to provide novel radiation-sensitive materials containing our novel brightening agents.

It is another object of our invention to provide novel photographic materials containing novel brightening agent ultraviolet absorbing compounds of our invention.

It is another object of our invention to provide polymers containing our novel brightening agents.

Still other objects of our invention will become apparent from consideration of the following specification and claims.

These and still other objects of our invention are accomplished by the synthesis and use of certain thiazolo(5,4-d)-thiazole derivatives substituted in the 2- and 5-positions with polycyclic aryl, heterocyclic, or other substituents which extend the conjugation of 2- and 5-position substituents. These compounds differ from the prior art compounds by not only absorbing ultraviolet light but by fluorescing in the visible region of the spectrum when excited by ultraviolet light.

Included among the brightening agents of our invention are those having the formula:

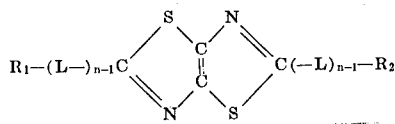

wherein L represents a divalent conjugated link, especially a link such as vinylene group, a phenylene group (e.g., an o-phenylene, a p-phenylene, etc.), a 2,5-oxadiazolylene group, a 2,5-thienylene group (e.g., 2,5-thienylene, 3,4-dimethyl-2,5-thienylene, 3,4-diethyl-2,5-thienylene, 3,4-dipentyl-2,5-thienylene, etc.) a 2,5-pyrylene group (e.g., 2,5-pyrylene, 3,4-dimethyl-2,5-pyrylene, 3,4-diethyl-2,5-pyrylene, 3,4-dipentyl-2,5-pyrylene, etc.); n represents an integer of from 1 to 2; and $R_1$ and $R_2$ each represent the same or different groups such as polycyclic aromatic group, such as a naphthyl group (e.g., 1-naphthyl, 2-naphthyl, 2-ethyl-1-naphthyl, 3-ethoxy-1-naphthyl, 4-cyano-1-naphthyl, 4-carboxy-1-naphthyl, 4-methanesulfonyl-1-naphthyl, 4-trifluoromethyl-1-naphthyl, 4-methyl-2-naphthyl, 4-carboxy-2-naphthyl, 5-amido-2-naphthyl, 5-methanesulfonyl-2-naphthyl, etc., a phenanthryl group (e.g., 1-phenanthryl, 2-phenanthryl, 3-phenanthryl, 9-phenanthryl, 4-methyl-1-phenanthryl, 4-ethyl-2-phenanthryl, 5-methoxy-3-phenanthryl, 4-cyano-1-phenanthryl, 4-trifluoromethyl-1-phenanthryl, etc.), a biphenyl group (e.g., 4-biphenyl, 2-biphenyl, 2-methyl-4-biphenyl, etc.), a terphenyl group (e.g., 1,4-diphenylbenzene, 1,3-diphenylbenzene, 1,2-diphenylbenzene, etc.), a quaterphenyl group, etc., or a heterocyclic group having from 5 to 6 atoms in the ring such as a coumaryl group (e.g., 3-coumaryl, 5-coumaryl, 7-coumaryl, 5-methyl-3-coumaryl, 7-ethoxy-3-coumaryl, 5-cyano-3-coumaryl, 5-amido-3-coumaryl, 5-methanesulfonyl-3-coumaryl, 5-trifluoromethyl-3-coumaryl, 3-methyl-5-coumaryl, 7-cyano-5-coumaryl, 7-trifluoromethyl-5-coumaryl, 3-acetyl-7-coumaryl, 3-carboxy-7-coumaryl, etc.), an oxazol-2-yl group (e.g., oxazol-2-yl, 4-methoxyoxazol-2-yl, 5-ethoxyoxazol-2-yl, benzoxazol-2-yl, 6-ethylbenzoxazol-2-yl, 7-ethoxybenzoxazol-2-yl, 5-chlorobenzoxazol-2-yl, 5,7-dichloro-6-methylbenzoxazol-2-yl, 5,7-di-t-pentylbenzoxazol-2-yl, 5-cyanobenzoxazol-2-yl, 6-cyano-5,7-di-t-pentylbenzoxazol-2-yl, etc.), a 2H-benzo(1,2,3)-triazol-2-yl group (e.g., 2H-benzo(1,2,3)-triazol-2-yl, 7-methoxy-2H-benzo(1,2,3)triazol-2-yl, 6-methanesulfonyl-2H-benzo(1,2,3)triazol-2yl, 7-trifluoromethyl-2H-benzo(1,2,3)-triazol-2-yl, etc.), an imidazol-2-yl group (e.g., imidazol-2-yl, benzimidazol-2-yl, 5-ethylbenzimidazol-2yl, 5-cyanobenzimidazol-2-yl, 6-trifluoromethylbenzimidazol-2-yl, 5,7-di-t-pentyl-benzimidazol-2-yl, 5,7-t-butylbenzimidazol-2-yl, etc.) and a 2-thienyl group (e.g., 2-thienyl, 4-methyl-2-thienyl, 4-cyano-2-thienyl, 5-phenyl-2-thienyl, 5-tolyl-2-thienyl, 3-methyl-2-thienyl, 4-trifluoromethyl-2-thienyl, etc.).

Our novel brightening agents which have appropriate spectral fluorescence described herein can be used to advantage in photographic color print material comprising a white reflecting support carrying three or more silver halide emulsion layers each sensitized respectively to the red, green and blue regions of the spectrum. Our brightening agents are advantageously incorporated in an organic solvent, and the resulting solution or dispersion dispersed in any layer of the photographic film such as an overcoat, one or more light-sensitive layers, interlayers, a subbing layer applied to the support or in the support itself. The photographic material may contain color-forming couplers or be of the type that is color developed with developers containing the color-forming couplers. Our brighteners are also useful to protect and brighten color photographic elements of the types used in silver-dye-bleach process, i.e., with color films wherein the dye is present before exposure and which is bleached in accordance to silver images produced during regular black-and-white development. Prints made of these materials show enhanced brightness in the nonimage areas and will have added protection from ultraviolet radiation in the layers below the brightener containing layer.

Where our brightening agents are to be dispersed in photographic layers, such as layers of color print materials, as described above, it is particularly advantageous for the R group to carry one or more tertiarypentyl groups, for instance, 5,7 -di-t-pentylbenzoxazol-2-yl, or 5,7-di-t-pentyl-benzimidazol-2-yl, etc.

Where the brightening agents are to be incorporated in synthetic polymers this is done advantageously by direct incorporation in a melt of the polymer, by using a low boiling organic solvent for brightener and polymer or by application with well-known techniques to the surface of the polymer for instance as a fiber or woven fabric.

Synthesis of the compounds of formula I may be carried out advantageously in many cases by reaction between dithio-oxamide with 2 moles of the appropriate aldehyde:

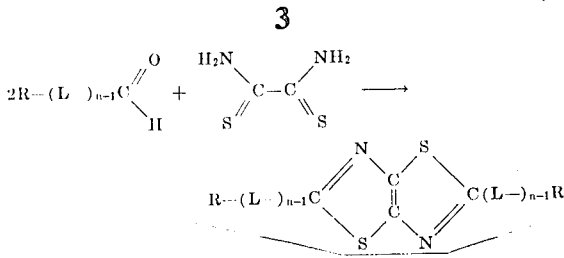

This synthetic route is particularly useful for the preparation of compounds where R is a naphthyl, phenanthryl or similar multicyclic aryl compound.

An alternative route is available in many cases where the R group is a heterocyclic residue involving the condensation and cyclization of thiazolo(5,4-d)thiazole-2,5-dicarboxylic acid with 2 moles of the appropriate intermediate compound.

For example, by conversion of thiazolo(5,4-d)thiazole-2,5-dicarboxylic acid to the corresponding acid chloride, condensation with 2 moles of o-aminophenol followed by cyclization, the bisbenzoxazole derivative will be formed.

The following examples are included for a further understanding of our invention.

EXAMPLE 1

2,5-Di-1'-naphthylthiazolo(5,4-d)thiazole

Dithio-oxamide (1.2 grams, 0.01 mole) and 1-naphthaldehyde (15.6 grams, 0.1 mole) are intimately mixed in an Erlenmeyer flask and heated in an oil bath to 200° C. At this point a spontaneous reaction occurs and water vapor is copiously evolved. After the reaction mixture has been maintained at 200° C. for 15 minutes it is cooled and diluted with acetone (about 150 ml.). The crude product (2.8 grams, 72 percent), m.p. 236°–238° C. is collected and recrystallization from benzene gives bright yellow needles having a m.p. 238°–239° C.

EXAMPLE 2

2,5-Di-2'-naphthylthiazolo(5,4-d)thiazole

A solution of 2-naphthaldehyde (9.4 grams, 0.06 mole) and dithio-oxamide (3.6 grams, 0.03 mole) in dimethylformamide (50 ml.) is boiled under reflux for three-fourths of an hour. The reaction mixture is cooled to 5° C. and the yellow crystalline solid (4.9 grams, 44 percent) m.p. 270°–276° C. collected, washed with ethanol and air dried. Recrystallization from benzene gives yellow plates, m.p. 285°–288° C.

EXAMPLE 3

2,5-Di-9'-phenanthrylthiazolo(5,4-d)thiazole

A solution of 9-phenanthraldehyde (12.4 grams, 0.06 mole) and dithio-oxamide (3.6 grams, 0.03 mole) in dimethylformamide (150 ml.) is boiled for 2½ hours. The reaction mixture is allowed to cool and the yellow solid (9.5 grams, 64 percent) m.p. > 300° C. is collected, washed with ethanol and air dried. Recrystallization from pyridine or tetrahydrofuran gives bright yellow needles, m.p. > 300° C.

EXAMPLE 4

2,5-Di-4'-biphenylthiazolo(5,4-d)thiazole

A solution of 4-phenylbenzaldehyde (4.04 grams, 0.022 mole) and dithio-oxamide (1.2 grams, 0.01 mole) in dimethylformamide (50 ml.) is boiled for one-half hour. The reaction mixture is allowed to cool, diluted with ethanol (100 ml.) and the orange solid (2.2 grams, 50 percent) m.p. > 300° C. collected, washed with ethanol and air dried. Recrystallization from chloroform gives fine yellow plates m.p. > 300° C.

EXAMPLE 5

2,5-Di-(2'-thienyl)thiazolo(5,4-d)thiazole

A solution of thienyl-2-aldehyde (13.4 grams, 0.12 mole) and dithio-oxamide (7.2 grams, 0.06 mole) in dimethylformamide (100 ml.) is boiled under reflux for one-half hour, and then cooled to 5° C. An orange-yellow solid (5.8 grams, 32 percent), m.p. 239°–242° C. is collected, washed with ethanol and air dried. Recrystallization gives bright yellow needles, m.p. 246°–247° C.

EXAMPLE 6

2,5-Bis(benzimidazol-2'-yl)thiazolo(5,4-d)thiazole

2-Benzimidazole carboxaldehyde is prepared by hydrolysis of 2-dichloromethylbenzimidazole hydrochloride (from o-phenylenediamine and dichloroacetic acid) with excess sodium acetate at the pH of 6 and 80 to 90° C. a purified via the bisulfite complex according to the procedure of Hensel Ber. 1965, 98, 1325). A solution of the 2-benzimidazolecarboxaldehyde (4.38 grams, 0.03 mole) and dithio-oxamide (1.8 grams, 0.015 mol.) and dimethylformamide (25 ml.) is boiled under reflux for one-half hour. The reaction mixture is allowed to cool to room temperature and the orange crystalline solid (2.5 grams, 45 percent), m.p. > 400° C. collected, washed in methanol, and air dried. Recrystallization from pyridine gives a bright yellow amorphous solid.

EXAMPLE 7

2,5-Bis(benzoxazol-2'-yl)thiazolo(5,4-d)thiazole 2,5-Thiazolo(5,4-d)thiazole dicarboxylic acid is prepared by oxidation of 2,5-di-2'-furylthiazolo(5,4-d)thiazole from furfuraldehyde and dithio-oxamide) with potassium permanganate in aqueous pyridine according to the procedure of Rotenberg, (Ph.D. Thesis Cornell University, 1960, 21, 1381; Chem. Abs., 1961, 55, 6470). To the anhydrous 2,5-thiazolo-(5,4-d)thiazole chloride (6 ml.) two drops of dimethylformamide is added, and the reaction occurs immediately. The solid dissolves completely in 15 minutes and the excess thionyl chloride is removed in vacuo to give 2,5-thiazolo(5,4-d)thiazole dicarbonyl chloride (1.3 grams) as an orange solid which is dissolved in hot chlorobenzene (20 ml.) and added to a solution of o-aminophenol (1.09 grams) in boiling chlorobenzene (30 ml.). An orange-brown precipitate forms immediately and the mixture is boiled under reflux for one-half hour, cooled and the 2,5-dicarboxamide (1.9 grams, 87 percent), m.p. > 340° C. is collected, washed with ether and air dried. The resulting 2,5-thiazolo(5,4-d)thiazole dicarboxamide (1.6 grams) is dissolved in polyphosphoric acid (100 ml. with stirring at 70° C. and the temperature gradually raised to 220° C. and maintained at 220°±10° C. for 1 hour. This brown solution is cooled to about 100° C., poured on to ice (about 200 grams) and the orange-brown precipitate is extracted with chloroform, and the extract washed with water, dried using anhydrous magnesium sulfate, and evaporated to dryness in vacuo, and the residue, (0.7 gram, 35 percent) sublimed 250°–270° C./0.1 mm. to give bright orange-yellow needles.

EXAMPLE 8

2,5-Bis(4-benzoxazol-2'-ylphenyl)thiazolo(5,4-d)thiazole

Route A

Ethyl-p-formylbenzoate is prepared by the Sommelet reaction from ethyl-ω-bromo-p-toluate according to the procedure of Fuson and Cooke (J. Amer. Chem. Soc., 1940, 62, 1180).

A solution of the ethyl-p-formylbenzoate (21.4 grams, 0.12 mole) and dithio-oxamide (7.2 grams, 0.6 mole) in dimethylformamide (50 ml.) is boiled under reflux for 1 hour. The reaction mixture is cooled and allowed to stand at 50° C. overnight and the crystalline solid (about 2 grams) is collected and washed with ethanol and air dried. Recrystallization from chloroform gives bright yellow needles (1.5 grams, 8 percent) m.p. 242°–243° C.

An intimate mixture of the 2,5-bis(4-ethoxycarbonylphenyl)thiazolo(5,4-d)thiazole (2.2 grams, 0.005 mole) and o-aminophenol (1.09 grams, 0.01 mole) is added to polyphosphoric acid (50 ml.) with stirring at 70° C. and the temperature gradually raised to 200° C. and maintained at 200°±10° C. for 1½ hours. The dark solution is cooled to about 100° C., poured onto ice (about 200 grams) and a fine orange-brown precipitate (2.3 grams, 87 percent), m.p. > 300° C. collected and washed thoroughly with ethanol and air dried.

Route B

A mixture of 2(p-tolyl)benzoxazole (52.3 grams) recrystallized N-bromosuccinimide (50 grams) and then benzoylperoxide (2.5 grams) is suspended in carbon tetrachloride (500 ml.) and heated under reflux with stirring for 5 hours. The solvent is removed under reduced pressure and the solid residue washed several times with boiling water, collected and air dried. The crude product is recrystallized with ethyl acetate to give cream colored needles. (51 grams, 72 percent), m.p. 173°–175° C.

Hexamethylenetetramine (15 grams) is dissolved in boiling chloroform (200 ml.) and the solution added to 2-(4-bromomethylphenyl)benzoxazole (28.8 grams, 0.1 mole) and the mixture heated under reflux for 16 hours. The quaternary ammonium salt which separates is collected by filtration, air dried and dissolved in 50 percent aqueous acetic acid (200 ml.) and heated under reflux for 1 hour. A solution of concentrated hydrochloric acid (25 ml.) in water (100 ml.) is added and the mixture heated for 10 minutes and allowed to cool and the solid (15 grams, 67 percent) m.p. 183°–185°C. collected.

A solution of 4-(benzoxazol-2-yl)benzaldehyde (2.25 grams, 0.01 mole) and dithio-oxamide (0.6 grams, 0.005 mole) in dimethylformamide (50 ml.) is boiled under reflux for 1½ hours and during this time a yellow solid separates. The reaction mixture is allowed to cool to room temperature and the yellow solid (1.9 grams, 72 percent) m.p. >300° C. washed with ethanol and air dried. Sublimation at 330°–360° C./0.1 mm. gives a bright yellow crystalline solid.

EXAMPLE 9

2,5-Di-(1-methylbenzimidazol-2-yl)thiazolo(5,4-d)thiazole

A paste of 2,5-di-(benzimidazol-2-yl)thiazolo(5,4-d)-thiazole (1.87 grams, see example 6) and dimethyl sulfate (5.04 grams) is heated on a steam bath for 1½ hours, cooled and diluted with water (25 ml.) and basified with dilute sodium hydroxide solution. The orange precipitate (1.6 grams) is collected, and washed with water, ethanol and ether, and air dried. Repeated sublimation at 260°–300° C./0.1 mm. gives bright yellow solid (1.2 grams, 60 percent).

EXAMPLE 10

2,5-Di-(5-chlorobenzoxazol-2-yl)thiazolo(5,4-d)thiazole 2,5-Thiazolo(5,4-d)thiazole dicarbonyl chloride is prepared from anhydrous 2,5-thiazolo(5,4-d)thiazole dicarboxylic acid (2.3 grams) by the method described in example 7. The 2,5-dicarbonyl chloride is dissolved in hot chlorobenzene (20 ml.) and added to a stirred solution of 2-amino-4-chlorophenol (2.9 grams) and boiling chlorobenzene (30 ml.). An orange-brown precipitate forms immediately and the mixture is boiled for a few minutes, cooled and the solid collected, washed with ether, and air dried. The 2,5-dicarboxamide (3 grams) is added to polyphosphoric acid (60 ml.) with stirring at 70° C.; the temperature gradually raised and maintained at 210° C. for 1 hour. The brown solution is cooled to about 100° C. and poured onto ice water (about 1 liter) and the solid collected and air dried. Repeat sublimation at 280°–320° C./0.1 mm. gives a bright orange-yellow solid (0.8 gram, 20 percent).

EXAMPLE 11

2,5-Di-(5,7-dichloro-6-methylbenzoxazol-2-yl)thiazolo-(5,4-d)thiazole 2,5-Thiazolo(5,4-d)thiazole dicarbonyl chloride [from anhydrous 2,5-thiazolo(5,4-d)thiazole dicarboxylic acid (2.3 grams, 0.01 mole)] is dissolved in benzene (60 ml.) and added to a stirred solution of 2-amino-4,6-dichloro-5-methylphenol (3.84 grams, 0.01 mole) in boiling benzene (60 ml.). The 2,5-dicarboxamide forms immediately and the mixture is cooled and the solid collected, washed with ether, and air dried. The solid (about 5 grams) is added to polyphosphoric acid (100 ml.) with stirring at 70° C. with the temperature gradually raised and maintained at 200°–210° C. for 1 hour. The reaction mixture is worked up as described previously and repeated sublimation of the crude product at 300°–320° C./0.1 mm. gives a bright yellow solid (0.7 grams, 15 percent).

EXAMPLE 12

2,5-Di-(5,7-di-t-pentylbenzoxazol-2-yl)thiazolo(5,4-d)thiazole 2,5-Thiazolo(5,4-d)thiazole dicarbonyl chloride [from anhydrous 2,5-thiazolo(5,4-d) thiazole dicarboxylic acid (1.15 grams)] is dissolved in benzene (30 ml.) and added to stirred solution of 2-amino-4,6-di-t-phenylphenol (2,49 grams) in boiling benzene (10 ml.). The 2,5-dicarboxamide forms immediately and the mixture is cooled and the solid collected, washed with ether, and air dried. The solid (2.3 grams) is added to polyphosphoric acid (50 ml.) with stirring at 70° C. and the temperature gradually raised and maintained at 240°–260° C. for 1 hour. The crude product is isolated as described previously and sublimed at 300°–320° C./0.1 mm. to give a pale yellow solid (0.7 gram, 21 percent) which is crystallized from chloroform-ethanol.

Still other brightening agents of our invention described by formula I are advantageously prepared by the methods illustrated above.

When employed in photography the compounds of our invention are advantageously incorporated in the hydrophilic film-forming layer or layers so as to be present in the finished image recording print material at concentrations ranging from approximately 1 to 50 mg./ft.$^2$ of the dry coating, or preferably at a concentration ranging between a coverage of about 7 and about 20 mg./ft.$^2$. The concentration of our brighteners can alternatively be expressed in terms of their quantity relative to the solvent used for their dispersion in the coating composition. Accordingly, our compounds are dissolved in concentrations of about 3 percent in relatively liquid solvents such as for example, tri-o-cresyl phosphate, dibutyl phosphate, dibutyl phthalate, dioctyl phthalate, diethyl lauramide, etc. and in more viscous solvents such as for example, polymeric resins, typical examples of which are the copolymer of butyl acrylate and acrylic acid, ethyl methacrylate and acrylic acid; styrene and esters of acrylic acids such as ethyl acrylate, ethyl methacrylate; also terpolymers prepared by the copolymerization of styrene or vinylidene chloride with an alkyl acrylate, e.g., butyl acrylate or methacrylate and acrylic or methacrylic acid. While it is preferred to introduce the U.V. absorbing brightening agents in the photographic material by coating of the film forming layers on the support, the agents may optionally be applied to or into the material after coating. This may be accomplished by, for example, either brushing or imbibition techniques.

Solvents used to advantage for incorporation of couplers, such as, those described in U.S. Pat. Nos. 2,304,939, 2,322,027, 2,801,170, 2,801,171, 2,949,360 and 2,272,191 are also used to advantage as solvents for incorporating the U.V. absorbing brightening agents of our invention in photographic layers.

Solvent solutions of our brighteners are advantageously incorporated by solution or dispersion in any of the hydrophilic colloid binders used in photographic elements, including natural materials, e.g., gelatin, albumin, agar-agar, gum arabic, alginic acid, etc., and synthetic materials, e.g., polyvinyl alcohol, polyvinyl pyrrolidone, cellulose ethers, partially hydrolyzed cellulose acetate, etc.

Any of the conventional photographic support materials are used advantageously for making our photographic elements, including photographic paper support, baryta coated paper, paper or other fibrous material coated with a hydrophobic resin [e.g., poly(ethylene terephthalate), polyethylene, polypropylene, poly(3-methylbutene-1), poly(octene-1), poly(decene-1), polyamides, polyacetals, polycarbonates, cellulose triacetate, cellulose acetate butyrate, ethyl cellulose, etc.] which are advantageously treated with corona discharge techniques just prior to coating the first gelatin layer over the resin as described in U.S. Pats., such as Nos. 3,220,842, 2,864,755, 2,864,756, etc., glass, conventional photographic film supports, such as, cellulose acetate, cellulose nitrate, etc. metal, etc.

Any hydrophilic colloid silver halide emulsions containing silver bromide, silver iodide, silver chloride, silver bromoiodide, silver chlorobromide, silver chlorobromoiodide, etc. well known in black-and-white and color photography are used advantageously in our elements.

EXAMPLE 13

Chloroform solutions are made for brightening agents 2, 4, 5, 6, 7, 8, 10, 11 and 12 respectively at a concentration of $1M \times 10^{-4}$. The fluorescent spectra obtained when the solutions are exposed to ultraviolet light are listed in the table below.

TABLE 1

| Brightening Agents | Fluorescent Spectra in λ max | | |
|---|---|---|---|
| 2 | | 442* | 464i |
| 4 | 430 | 448* | |
| 5 | | 432 | 452* |
| 6 | | | 462* | 489i |
| 7 | | 432 | 453* | 480i |
| 8 | | 438 | 465* |
| 10 | | 431 | 455* | 480i |
| 11 | | 440 | 464* |
| 12 | | 443 | 464* |

*principal maximum i-inflection

Similar fluorescent spectra are produced by other brightening agents of our invention when dissolved in chloroform or other appropriate solvents.

EXAMPLE 14

A solution of 2,5-di-(5,7-di-t-pentylbenzoxazol-2-yl)-thiazolo-(5,4-d)thiazole is made in dibutyl phthalate and the solution is dispersed in aqueous gelatin such that when coated on a paper support the brightening agent is coated at the rate of 10 mg./ft.$^2$ and the dibutyl phthalate at the rate of 1 g./ft.$^2$. When the coating is dried it is irradiated with ultraviolet light and the fluorescent emission is measured through a blue (B–2) filter giving an initial reading substantially the same as is obtained by irradiating the coating with the same ultraviolet light, and using the same filter and same measuring instrument after the coating has been exposed to 70,000 foot candle hours of south sky light. Data show that our brightening agents not only give good fluorescent emission when initially coated, but continue to give good fluorescent emission even after 70,000 foot candle hours exposure to south sky light.

EXAMPLE 15

A dibutyl phthalate solution is made for each of brightening agents 4,5,6, 10 and 11, and these are dispersed in separate portions of gelatin. Each of these dispersions are coated on a separate piece of the photographic support as described in example 14. These coatings illustrate the valuable fluorescing properties of our brightening agents.

EXAMPLE 16

Example 14 is repeated excepting that the gelatin used for dispersing our brightening agents contains a dispersion of baryta. The results obtained are very similar to those obtained in example 14.

EXAMPLE 17

A light-sensitive gelatino silver halide emulsion is made and coated over the gelatin layer containing a dispersion of 2,5-di-(5,7-di-t-petnylbenzoxazol-2-yl)thiazolo-(5,4-d)-thiazole that is coated on a support in example 14. Another portion of the silver halide emulsion is coated over the gelatin layer containing the dispersion of baryta and our brightening agent coating made in example 16. After drying, the coatings are given light-image-exposure and developed in a conventional aqueous alkaline developer solution containing a silver halide developing agent, such as, hydroquinone to produce a silver image, the developed element is washed and fixed in a conventional sodium thiosulfate fixing bath, washed and dried. Control coatings are made just like those described above in this example excepting that no brightening agent is dispersed in the gelatin layer coated directly on the support. These control coatings are dried, light-image-exposed, developed, fixed, washed, and dried as described previously in this example. In each instance, comparison of the prints made according to our invention with the respective controls shows the valuable highlight brightening produced by our brightening agents.

Results similar to those obtained in examples 14–17 are obtained when these and other brightening agents of our invention are used with solvents or dispersing agents other than dibutyl phthalate such as tri-o-cresyl phosphate, dioctyl phthalate, diethyl lauramide as well as polymeric resins described herein previously.

Our brightening agents are valuable for incorporation in a wide variety of synthetic organic materials, brightening them and protecting them against the effects of ultraviolet light. Included among the organic materials in which our brightening agents are advantageously incorporated are the polyolefins, such as polyethylene, polypropylene, etc., polyesters, such as poly(ethylene terephthalate), etc., the poly sulfones, the polyurethanes, the polycarbonates, cellulose esters, such as cellulose acetate, cellulose proprionate, cellulose butyrate, cellulose acetate propionate, etc., the polyvinyls, such as, polyvinyl chloride, polyvinylidene chloride, polyvinylidene fluoride, etc., the polyamides, such as hexamethylenediamine adipate, melamine resins, phenolic resins, aniline resins, furan resins, carbamide resins, and their prepolymers, the polyacrylates, the polymethacrylates, etc., and copolymers and terpolymers of the above polymers. Our new brightening agents are advantageously added to or incorporated into these various organic materials before or during their shaping into various structures and shapes such as blocks, plates, sections, injection molding compositions such as chips, granulates, etc. predominantly two dimensional bodies such as filaments, fibers, bristles, or wires, etc. Thus, for example, in the manufacture of films, foils, tapes, or molding compositions, brightening agents are advantageously added to the molding or injection molding compositions or are dissolved, dispersed or in any other way intimately and homogeneously distributed in the spinning mass before spinning. The brighteners are also added advantageously to the starting materials, reaction mixtures or in the intermediate products used to produce a synthetic or semisynthetic material. The amount of brightening agent that is advantageously incorporated in such organic materials as described above is in the range from about 0.001 percent up to about 0.5 percent by weight or more. Usually brightening agents are used in the range from about 0.012 to about 0.2 percent by weight the organic materials.

EXAMPLE 18

Compositions are made according to our invention by mixing brightening agent No. 12 at a concentration of 0.1 percent in each of the following: a poly(ethylene terephthalate), a polysulfone, a polycarbonate, a polypropylene, a polyacrylate, a copolymer of polystyrene, polyvinyl chloride, and polyethylene. Polymer and brightening agents are processed in a Banbury mixer at a temperature in the range from about 300° to 625° F. The brightened polymeric compositions are rolled into sheets. These sheets are not only effectively protected against the effects of ultraviolet light from prolonged exposure to light, but exhibit the brightening characteristics produced by the brighteners contained in them. Similar results are obtained when this example is repeated using other brighteners of our invention at concentrations in the range from 0.001 to 0.5 percent. (See example 12 for brightening agent 12)

The invention has been described in detail with particular reference to preferred embodiments thereof, but it will be understood that variations and modifications can be effected within the spirit and scope of the invention.

We claim:

1. A photographic element comprising a support having coated thereon at least one hydrophilic colloid layer containing a brightening agent having the formula:

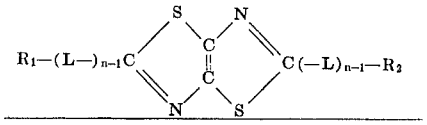

wherein L represents a divalent conjugated link; $n$ represents an integer of from 1 to 2; and $R_1$ and $R_2$ each represents a group selected from the class consisting of a polycyclic aromatic group, and a heterocyclic group; and at least one hydrophilic colloid layer containing light-sensitive silver halide.

2. A photographic element comprising a support having coated thereon at least one hydrophilic colloid layer containing a brightening agent having the formula:

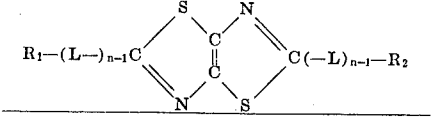

wherein L represents a divalent conjugated link selected from the class consisting of a vinylene group, a phenylene group, a 2,5-oxadiazolylene group, a 2,5-thienylene group and a 2,5-furylene group; $n$ represents an integer of from 1 to 2; and $R_1$ and $R_2$ each represents a group selected from the class consisting of a naphthyl group, a phenanthryl group, a biphenyl group, a terphenyl group and a quaterphenyl group; and at least one hydrophilic colloid layer containing light-sensitive silver halide.

3. A photographic element comprising a support having coated thereon at least one hydrophilic colloid layer containing a brightening agent having the formula:

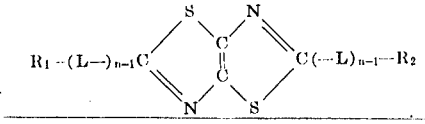

wherein L represents a divalent conjugated link selected from the class consisting of a vinylene group, a phenylene group, a 2,5-oxadiazolylene group, a 2,5-thienylene group and a 2,5-furylene group; $n$ represents an integer of from 1 to 2; and $R_1$ and $R_2$ each represents a heterocyclic group having from 5 to 6 atoms in the ring; and at least one hydrophilic colloid layer containing light-sensitive silver halide.

4. A photographic element of claim 1 in which the brightening agent is 2,5-di(5,7-di-t-pentylbenzoxazol-2-yl)-thiazolo(5,4-d)thiazole.

5. A photographic element of claim 1 in which the brightening agent is 2,5-di(5,7-dichloro-6-methylbenzoxazol-2-yl)-thiazolo(5,4-d)thiazole.

6. A photographic element of claim 1 in which the brightening agent is 2,5-di(2'-thienyl)thiazolo(5,4-d)thiazole.

7. A photographic element of claim 1 in which the brightening agent is 2,5-di(4'-biphenyl)thiazolo(5,4-d)thiazole.

8. A photographic element of claim 1 in which the brightening agent is 2,5-di(5-chlorobenzoxazol-2-yl)thiazolo-(5,4-d)thiazole.

* * * * *